United States Patent
Weber et al.

(10) Patent No.: US 8,994,580 B2
(45) Date of Patent: Mar. 31, 2015

(54) SENSOR, ADJUSTING METHOD, AND MEASURING METHOD FOR A SENSOR

(75) Inventors: Dieter Weber, Leonberg (DE); Gerald Zeller, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 493 days.

(21) Appl. No.: 13/250,131

(22) Filed: Sep. 30, 2011

(65) Prior Publication Data

US 2012/0086593 A1 Apr. 12, 2012

(30) Foreign Application Priority Data

Oct. 11, 2010 (DE) .......................... 10 2010 042 276

(51) Int. Cl.
*G01S 7/40* (2006.01)
*G01S 13/93* (2006.01)
*G01S 7/52* (2006.01)

(52) U.S. Cl.
CPC ........ *G01S 7/4026* (2013.01); *G01S 2013/9375* (2013.01); *G01S 7/52004* (2013.01); *G01S 2007/4034* (2013.01); *G01S 2007/403* (2013.01); *G01S 2007/4086* (2013.01)
USPC .............................. 342/70; 342/173; 342/174

(58) Field of Classification Search
CPC ......... G01S 13/931; G01S 7/03; G01S 7/032; G01S 7/4026; H01Q 1/3233; H01Q 9/0407
USPC ............................... 342/70–72, 175, 173–174
See application file for complete search history.

(56) References Cited

U.S. PATENT DOCUMENTS

| | | | |
|---|---|---|---|
| 5,260,710 A * | 11/1993 | Omamyuda et al. | 342/70 |
| 5,680,139 A * | 10/1997 | Huguenin et al. | 342/175 |
| 5,905,457 A * | 5/1999 | Rashid | 342/70 |
| 5,926,127 A * | 7/1999 | Schmidt et al. | 342/70 |
| 5,949,365 A * | 9/1999 | Wagner | 342/70 |
| 6,573,860 B1* | 6/2003 | Winter et al. | 342/70 |
| 6,674,392 B1* | 1/2004 | Schmidt et al. | 342/70 |
| 7,109,917 B2* | 9/2006 | Schmidt et al. | 342/175 |
| 7,145,505 B2* | 12/2006 | Gottwald et al. | 342/175 |
| 7,151,479 B2* | 12/2006 | Beez et al. | 342/70 |
| 7,554,573 B2 | 6/2009 | Mizusawa | |
| 8,487,810 B2* | 7/2013 | Grau Besoli et al. | 342/134 |
| 8,665,137 B2* | 3/2014 | Wintermantel | 342/59 |

(Continued)

FOREIGN PATENT DOCUMENTS

| | | |
|---|---|---|
| DE | 10 2008 043 977 | 6/2010 |
| EP | 1 001 274 | 5/2000 |

(Continued)

*Primary Examiner* — John B Sotomayor
(74) *Attorney, Agent, or Firm* — Kenyon & Kenyon LLP

(57) ABSTRACT

A sensor for a vehicle includes a sensor housing, a surface of which sensor housing has at least three areas defining at least three reference measuring fields. Positions of the at least three reference measuring fields define a reference plane. The reference measuring fields have (i) a surface texture which enables tactile position determination of the reference measuring fields, and/or (ii) a surface characteristic which enables optical position determination. The detected positions of the reference measuring fields are used to define the reference plane. A mechanical sensor axis of the target sensor is defined as extending orthogonally to the reference plane. The mechanical sensor axis is used to (a) ascertain an angle of deviation between the mechanical sensor axis and a known sensor axis of the sensor, and/or (b) align the mechanical sensor axis to a travel axis of the vehicle.

7 Claims, 4 Drawing Sheets

(56) References Cited

U.S. PATENT DOCUMENTS

| | | | |
|---|---|---|---|
| 2005/0116854 A1* | 6/2005 | Beez et al. | 342/70 |
| 2005/0225481 A1* | 10/2005 | Bonthron | 342/175 |
| 2007/0002305 A1* | 1/2007 | Lehre et al. | 356/4.01 |
| 2009/0080697 A1 | 3/2009 | Kishikawa et al. | |
| 2009/0267822 A1* | 10/2009 | Shinoda et al. | 342/70 |
| 2010/0110189 A1 | 5/2010 | Kuboyama et al. | |
| 2010/0238068 A1* | 9/2010 | Seidel et al. | 342/175 |
| 2010/0245579 A1 | 9/2010 | Hongo | |
| 2011/0199252 A1* | 8/2011 | Klar et al. | 342/70 |
| 2011/0260912 A1* | 10/2011 | Binzer et al. | 342/175 |
| 2012/0112953 A1* | 5/2012 | Grau Besoli et al. | 342/146 |

FOREIGN PATENT DOCUMENTS

| | | |
|---|---|---|
| EP | 1 927 865 | 6/2008 |
| WO | WO 2005/071434 | 8/2005 |
| WO | WO 2009/036176 | 3/2009 |

\* cited by examiner

SENSOR, ADJUSTING METHOD, AND MEASURING METHOD FOR A SENSOR

BACKGROUND INFORMATION

The manufacture of radar sensors for vehicles is subject in particular to the tolerances of the used mechanical components on or in which the antennas of the radar components are mounted. This typically results in a mechanical sensor axis and a radar sensor axis that deviate from one another.

The radar sensor is assembled in the vehicle so that the radar axis is aligned at a precisely defined angle with respect to the travel axis. This may be performed in two ways in particular.

The sensor is installed on the vehicle and is in operation. This means that it is transmitting radar waves. Actual value $\alpha$ of the azimuth angle and the elevation angle of the radar axis in relation to the travel axis of the vehicle is ascertained from the reflected radar intensities. Deviations from the setpoint value, i.e., the angle between the radar axis and the travel axis, are corrected with the aid of adjusting means on the radar sensor holder or on the radar sensor itself. This type of adjustment may also be referred to as an active adjustment.

In particular, it is disadvantageous that a radar sensor must be in operation for the adjustment and in this respect transmits radar waves that may interfere with electrical consumers, for example.

For the second type of adjustment which may also be referred to as a passive adjustment, a mirror adhered to or vapor-deposited on the radar sensor is additionally used. At the radar sensor manufacturing plant, an angle deviation $\beta$ between the radar axis and a mirror normal is ascertained and stored in the sensor. A deviation y of the mirror normal with respect to the travel axis is then measured by the vehicle manufacturer. The stored values are read out, calculated, and taken into consideration as correction factors. The radar axis is corrected to the travel axis via an adjustment.

It is disadvantageous in particular that the mirror position may change over time due to aging of the adhesive foil. In particular, the properties of the adhesive foil under the mirror change over the service life of the sensor. For example, it becomes brittle due to high temperatures or swells due to high humidity. As a result, the originally measured and stored deviations of the radar axis and the mirror normal no longer match the actual values. As a result, passive adjustment is not possible in a service case, i.e., in particular during a function test of the radar sensor.

Moreover, the reflectivity may decrease due to contamination of and/or oxidation of and/or mechanical influences on the reflective layer. A passive adjustment may not be reliably ensured in a service case.

SUMMARY OF THE INVENTION

An object of the present invention is therefore to provide a sensor, an adjusting method, and a measuring method that overcome the known disadvantages and allow correct adjustment in a service case.

According to one aspect of the present invention, a sensor including a sensor housing is provided. Moreover, at least three reference measuring fields situated on the sensor housing are provided. The three reference measuring fields are preferably separated from one another, in particular parallel to one another. A reference plane may be formed with the aid of the three reference measuring fields. A normal to the reference plane is defined as a mechanical sensor axis.

According to another aspect, an adjusting method for a sensor situated in a vehicle including a sensor housing is provided, a reference plane being formed with the aid of at least three reference measuring fields in such a way that a mechanical sensor axis runs orthogonally to the reference plane. The mechanical sensor axis is then aligned relative to a travel axis of the vehicle.

According to another aspect, a measuring method for a sensor including a sensor housing is provided, a reference plane being formed with the aid of at least three reference measuring fields in such a way that a mechanical sensor axis runs orthogonally to the reference plane. An angle deviation between the mechanical sensor axis and a sensor axis is then ascertained. The measuring method may preferably be performed at a sensor manufacturing plant. In this respect, the measuring method may also be referred to as an industrial measuring method, for example.

With the aid of the three reference measuring points, it is advantageously possible to reliably determine the mechanical sensor axis at any time over the entire service life of the sensor. No special reflective surfaces, e.g., mirrors or corresponding vapor depositions, are needed. Angle deviations between the sensor axis and the mechanical sensor axis measured at a manufacturing plant and stored in the sensor advantageously do not change over the service life and thus remain valid. A quick and particularly cost-effective adjustment in a service case is thus possible.

The sensor is preferably a wave sensor. This means that it transmits physical waves that may be reflected by objects or obstacles. The sensor preferably receives the reflected physical waves and may detect them. For this purpose, the sensor has a corresponding transmitter and/or a corresponding receiver or detector. A sensor axis is defined in particular as an axis parallel or collinear to a wave vector $\vec{k}$ corresponding to the propagating wave transmitted by the sensor.

According to one specific embodiment, the sensor is a radar sensor and/or an ultrasound sensor. This means that the sensor transmits radar waves and/or ultrasound waves. Therefore, a distance between a vehicle and an object preceding the vehicle, e.g., a preceding vehicle, may thus be detected in an advantageous manner. In this case a sensor axis is defined in particular as an axis parallel or collinear to a wave vector $\vec{k}$ of the radar wave or the ultrasound wave. In the case of a radar wave that is an electromagnetic wave, wave vector $\vec{k}$ is perpendicular to E-field vector $\vec{E}$ and perpendicular to B-field vector $\vec{B}$. In the case of a radar sensor, the sensor axis may also be referred to as a radar sensor axis. In the case of an ultrasound sensor, the sensor axis may also be referred to as an ultrasound sensor axis.

According to one specific embodiment, at least one reference measuring field is designed for tactile and/or optical position determination. As a result, the position of the reference measuring field may be determined tactilely in an advantageous manner with the aid of a scanner or several scanners. In particular, the position of the reference measuring field may be determined optically in an advantageous manner with the aid of a laser. All three reference measuring fields are preferably designed for tactile and/or optical position determination. In particular, the reference plane may be defined in a particularly simple manner with the aid of the measured positions of the three reference measuring fields.

According to another specific embodiment, at least one reference measuring field includes a flat surface. In this case, the reference measuring field may also be referred to as a reference measuring surface. In particular, the reference measuring field is formed as a flat surface. All three reference measuring fields are preferably formed as a flat surface. In particular, the three flat surfaces are situated parallel to one another, and the three flat surfaces are preferably on one plane. In general, the reference measuring fields may be situated in particular on a common plane, preferably when the three reference measuring fields are situated parallel to one another. According to another specific embodiment, the surface may be rough and/or reflective. This allows more precise and simpler optical and/or tactile position determination in particular.

According to another specific embodiment, at least one reference measuring field is an integral part of the sensor housing. All three reference measuring fields are preferably an integral part of the sensor housing. The reference measuring field or the reference measuring fields is/are preferably integrated into the sensor housing. As a result, it is advantageously possible that the reference measuring fields may be formed during the manufacture of the sensor in/on the sensor housing so that a particular position of the reference measuring fields advantageously does not change over time, in particular over the service life of the sensor. The reference measuring field or reference measuring fields is/are preferably situated directly on a dome, in particular a radome or mounting dome, and/or on a sensor lens. The sensor housing preferably has several, preferably four, domes, in particular radomes or mounting domes.

DETAILED DESCRIPTION

Figure 1:
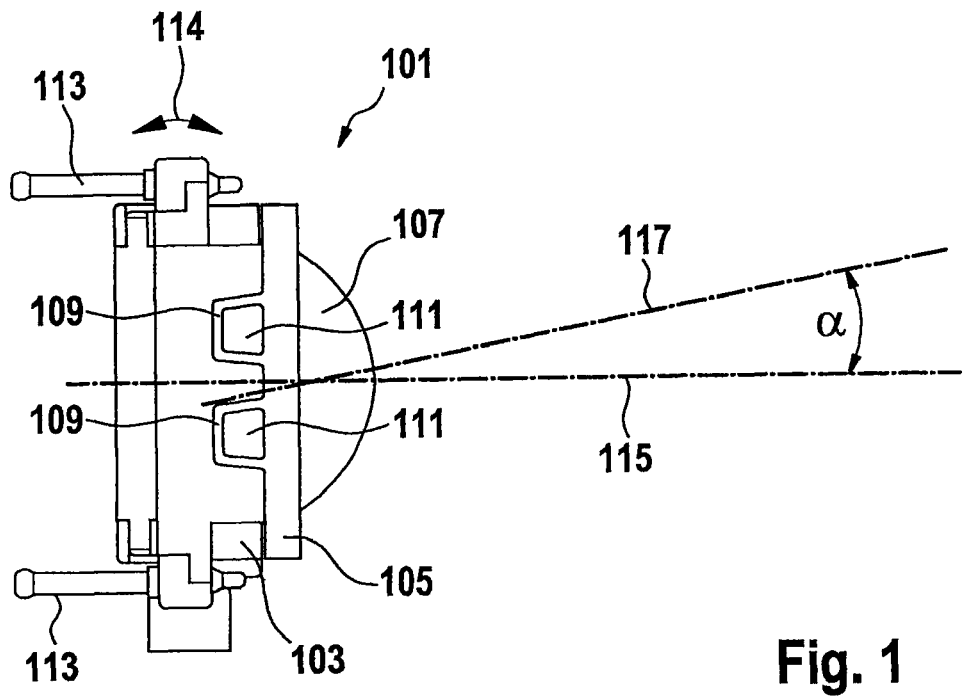
FIG. 1 shows an active adjustment in a known sensor.

FIG. 1 shows a side view of a sensor 101 according to the related art. Sensor 101 includes a square sensor housing 103 having a sensor lens cover 105. Sensor lens cover 105 has a concave area 107. Sensor lens cover 105 also has two tabs 109 that may engage in corresponding receptacles or projections 111 on sensor housing 103 so that sensor lens cover 105 is attached to housing 103. Sensor housing 103 also has four adjusting means 113 which are situated on the four corners of sensor housing 103. Adjusting means 113 are also designed to secure sensor housing 103 in or on a vehicle (not shown). For example, adjusting means 113 may include screws so that a distance between the corresponding corner of sensor housing 103 and the corresponding attachment position in the vehicle may be set. This setting option is represented by a double arrow 114.

A travel axis of the vehicle identified by reference numeral 115 is also shown. In general, a travel axis of the vehicle is the axis along which the vehicle moves forward or backward. A sensor axis is identified by reference numeral 117. An angle α identifies an angle deviation between travel axis 115 and sensor axis 117. Only an angle deviation α in relation to the figure plane is shown in FIG. 1. An angle deviation in relation to a plane perpendicular to the figure plane may occur. Angle deviation α identifies an azimuth angle and/or an elevation angle of sensor axis 117 in relation to travel axis 115.

In the case of an active adjusting method, sensor 101 is installed on the vehicle and is in operation, i.e., it transmits physical waves. Angle deviation α of the azimuth angle and the elevation angle of the sensor axis in relation to the travel axis are ascertained from the reflected wave intensities. Angle deviation α may also be referred to as an actual value. Deviations from a setpoint value (angle between sensor axis 117 and travel axis 115) may be corrected with the aid of adjusting means 113.

Figure 2:
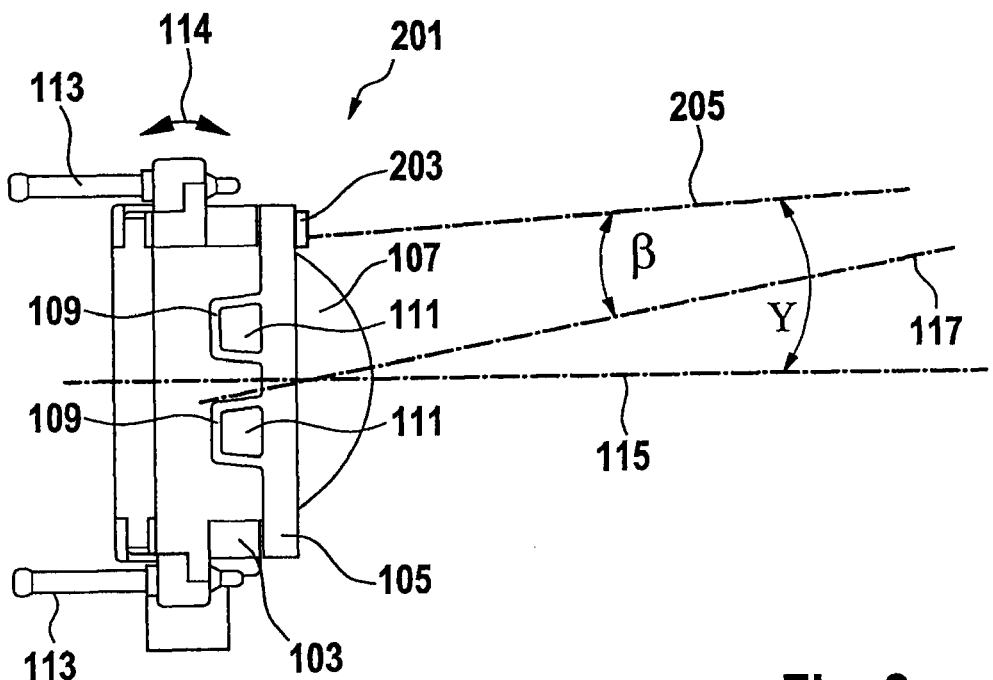
FIG. 2 shows a passive adjustment in another known sensor.

FIG. 2 shows a side view of another known sensor 201. Sensor 201 has an identical design to that of sensor 101 from FIG. 1. Moreover, sensor 201 includes a mirror 203, which is adhered to sensor lens cover 105. However, mirror 203 may also be vapor-deposited on sensor lens cover 105.

An angle deviation β between sensor axis 117 and a mirror normal 205 is ascertained at a sensor manufacturing plant and is stored in sensor 201. A deviation Y of mirror normal 205 and travel axis 115 is measured at a vehicle production plant. The stored values, in particular angle deviation β, are read out, calculated, and taken into consideration as correction factors. Sensor axis 117 is corrected to travel axis 115 with the aid of adjusting means 113.

Figure 3:
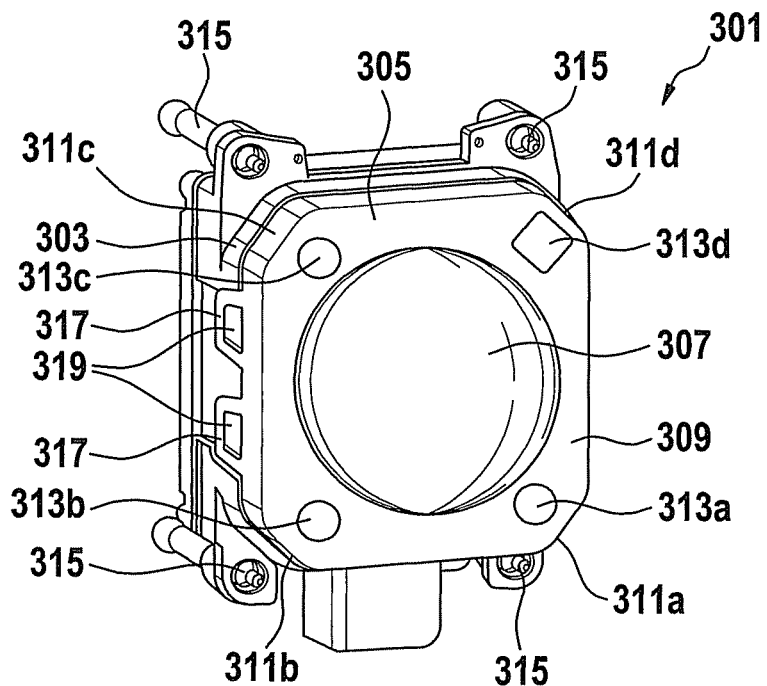
FIG. 3 shows an oblique view of a sensor according to the present invention.

FIG. 3 shows an oblique view of the front of a sensor 301 according to the present invention. Sensor 301 includes an octagonal sensor housing 303 having an octagonal sensor lens cover 305. Sensor lens cover 305 has a concave area 307 curving away from sensor housing 303. The octagonal specific embodiment shown here is only an example and is not limiting. According to other specific embodiments (not shown), a square shape, in particular a quadratic shape, preferably a rectangular shape, may be provided. In particular, a circular shape may also be provided. Sensor housing 303 and cover 305 are preferably made of plastic.

Sensor lens cover 305 also includes a planar area 309, which surrounds concave area 307. Reference measuring fields 313a, 313b, and 313c are situated in three corner areas 311a, b, c, respectively, in planar area 309. Reference measuring fields 313a, 313b, and 313c are preferably designed as a flat surface. In particular, reference measuring fields 313a, b, c are designed for optical and/or tactile position determination so that a position of corresponding reference measuring field 313a, 313b, and 313c may be detected. For example, reference measuring fields 313a, b, c may have a rough surface and/or a reflective surface. Therefore, the position of a defined point on the three reference measuring fields 313a, 313b, and 313c may be measured in particular with the aid of scanners or optical tools, such as a laser, so that a reference plane is defined in an advantageous manner. Such a point may also be referred to as a reference measuring point. Sensor 301 is preferably fixedly positioned in a defined position. Reference measuring fields 313a, b, c preferably have a surface of at least 25 mm². Reference measuring fields 313a, b, c are preferably rectangular, preferably quadrangular, and preferably have a length of 5 mm and a height of 5 mm. According to another specific embodiment, reference measuring fields 313a, b, c may also be formed differently. This means in particular that reference measuring field 313a may have a rough surface, for example, and reference measuring fields 313b and 313c may have a reflective surface. They may also differ with respect to shape and size, for example.

Sensor housing 303 also includes four adjusting means 315 whose height is adjustable, for example with the aid of screws. Adjusting means 315 are also used to secure sensor housing 303 and thus sensor 301 in or on the vehicle. In this respect, adjusting means 315 may also be referred to as fastening means. Analogously to sensors 101 and 202, sensor lens cover 305 includes on two opposite sides two tabs or snap-in pins 317, which may engage in corresponding locking protrusions 319 of sensor housing 303, so that cover 305 is securely fastened to housing 303.

As is apparent in FIG. 3, reference measuring fields 313a, b, c have a circular shape. Moreover, sensor lens cover 305 has a fourth reference measuring field 313d situated in a fourth corner area 311d. A particularly sensitive and precise definition of the reference plane is made possible by a fourth reference measuring field.

Figure 4:
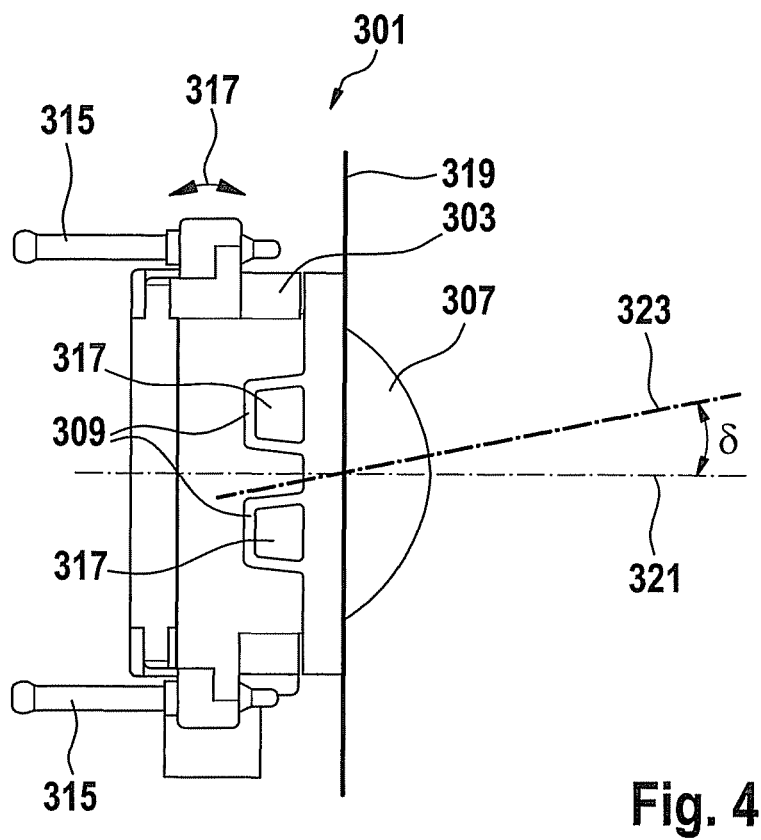
FIG. 4 shows a side view of the sensor from FIG. 3.

FIG. 4 shows a side view of sensor 301 from FIG. 4. An adjustment option is shown here by double arrow 317. Reference plane 319 defined by the four reference measuring fields 313a, b, c, d is also shown. A normal to reference plane 319 is identified by reference numeral 321 and corresponds to a mechanical sensor axis. A sensor axis is identified by reference numeral 323. An angle deviation between sensor axis 323 and mechanical sensor axis 321 is identified by δ.

Angle deviation δ between sensor axis 323 and mechanical sensor axis 321 is ascertained at a sensor manufacturing plant in particular and stored in sensor 301. At a vehicle manufacturer or a maintenance company performing a function test of sensor 301, for example, a deviation between mechanical sensor axis 321, i.e., the normal of reference plane 319, and a travel axis (not shown) is measured. The stored values, in particular deviation δ, are read out, calculated, and taken into consideration as correction factors. Sensor axis 323 may be aligned to the travel axis with the aid of the adjusting means.

Both when ascertaining angle deviation δ and when ascertaining the deviation between mechanical sensor axis 321 and the travel axis, reference plane 319 is formed with the aid of four reference measuring fields 313a, b, c, d in that a corresponding position of reference measuring fields 313a, b, c, d is detected in particular with the aid of optical and/or tactile measuring methods. Sensor 301 is preferably designed as a radar sensor.

Figure 5:
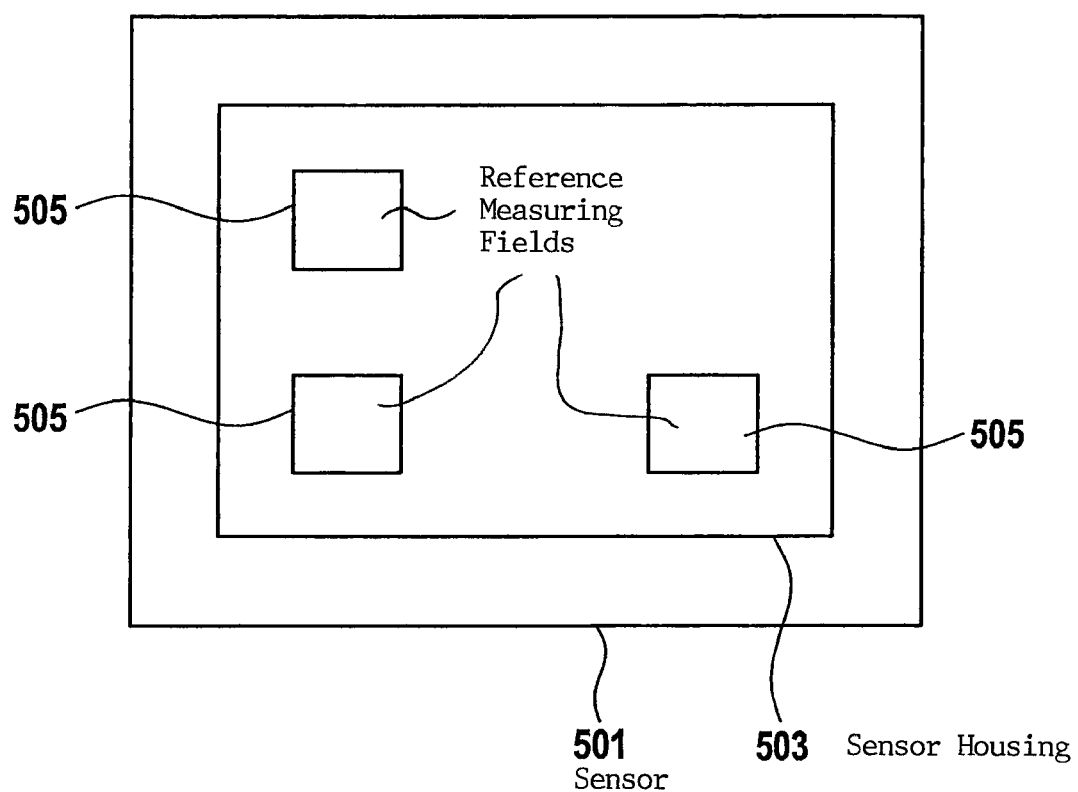
FIG. 5 shows a schematic view of another sensor according to the present invention.

FIG. 5 shows another sensor 501 according to the present invention. The sensor includes a sensor housing 503, which has three reference measuring fields 505. Sensor 501 is designed as a radar sensor.

Figure 6:
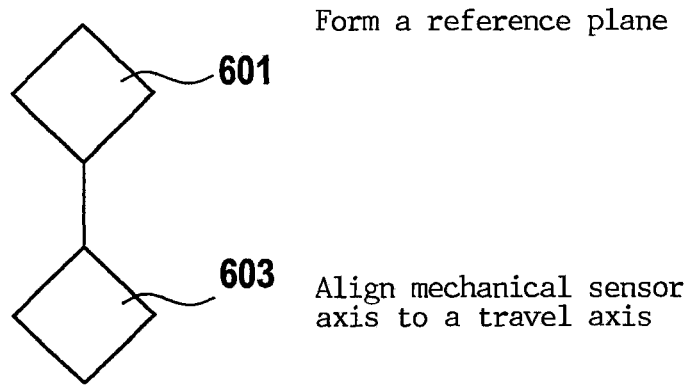
FIG. 6 shows a flow diagram of an adjusting method.

FIG. 6 shows a flow diagram of an adjusting method for a sensor situated in a vehicle including a sensor housing. For example, this may be a sensor 301 or 501. A reference plane is formed in a first step 601 with the aid of at least three reference measuring fields, a mechanical sensor axis running orthogonally to the reference plane. The mechanical sensor axis is aligned relative to a travel axis in a subsequent step 603.

Figure 7:
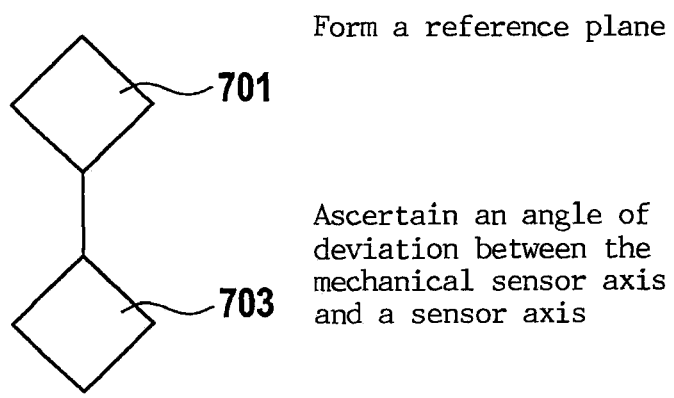
FIG. 7 shows a flow diagram of a measuring method.

FIG. 7 shows a flow diagram of a measuring method for a sensor including a sensor housing. For example, this may be a sensor 301 or 501. A reference plane is formed in a first step 701 with the aid of at least three reference measuring fields, a mechanical sensor axis running orthogonally to the reference plane. An angle deviation between the mechanical sensor axis and a sensor axis is ascertained in a subsequent step 703. According to one specific embodiment (not shown), this angle deviation may be stored in the sensor and used as a correction factor in the adjusting method according to the present invention.

In summary, a core of the present invention is to provide a sensor having at least three reference measuring fields, the reference measuring fields being able to be situated preferably on the radome and/or a sensor lens so that a mechanical sensor axis may be determined reliably at any time over the service life. The position of the three reference measuring fields is selected in particular in such a way that they do not change their position with respect to the sensor axis over the service life. In contrast to the related art, no particularly reflective surfaces, such as mirrors or vapor depositions, are needed, so such a mirror may advantageously be dispensed with. As a result, costs and materials are saved in particular. The originally stored values regarding the deviations remain valid in particular over the service life of the sensor. Since it is possible to determine the reference plane using three reference measuring fields, the adjusting method may also be referred to as a 3-point adjusting method. The measuring method may also be referred to as a 3-point measuring method. The sensor is preferably designed as a radar sensor, preferably as a medium-range radar sensor. According to further preferred specific embodiments, the sensor may also be designed as a short-range radar sensor, a medium-range radar sensor, or as a long-range radar sensor. The measuring method and the adjusting method may be applied or performed accordingly using the above-mentioned sensors.

What is claimed is:

1. A sensor comprising:
   a sensor housing, wherein a surface of the sensor housing has at least three areas defining at least three reference measuring fields, and wherein positions of the at least three reference measuring fields define a reference plane, and wherein at least one of the reference measuring fields includes a flat surface area.

2. The sensor according to claim 1, wherein at least one of the reference measuring fields has a surface texture which enables tactile position determination of the at least one of the reference measuring fields.

3. The sensor according to claim 1, wherein at least one of the reference measuring fields has a surface characteristic which enables optical position determination of the at least one of the reference measuring fields.

4. The sensor according to claim 1, wherein the sensor housing has a lens cover, the lens cover having a planar portion and a concave portion, and wherein at least one of the reference measuring fields is situated on the planar portion of the lens cover.

5. The sensor according to claim 1, which comprises a radar sensor.

6. An adjusting method for a target sensor situated in a vehicle including a sensor housing, the method comprising:
   providing on a surface of the sensor housing at least three areas defining at least three reference measuring fields;
   detecting, using a position sensor, the positions of the at least three reference measuring fields;
   defining a reference plane with the aid of the detected positions of the at least three reference measuring fields, wherein a mechanical sensor axis of the target sensor is defined as extending orthogonally to the reference plane; and
   aligning the mechanical sensor axis to a travel axis of the vehicle.

7. A measuring method for a target sensor including a sensor housing, the method comprising:
   providing on a surface of the sensor housing at least three areas defining at least three reference measuring fields;
   detecting, using a position sensor, the positions of the at least three reference measuring fields;
   defining a reference plane with the aid of the detected positions of the at least three reference measuring fields, wherein a mechanical sensor axis of the target sensor is defined as extending orthogonally to the reference plane; and ascertaining an angle of deviation between the mechanical sensor axis and a known sensor axis of the target sensor.

* * * * *